Jan. 19, 1960   L. R. FELLOWS   2,921,473
DRIVE CONNECTION BETWEEN A STARTER MOTOR AND AN ENGINE
Filed June 10, 1958
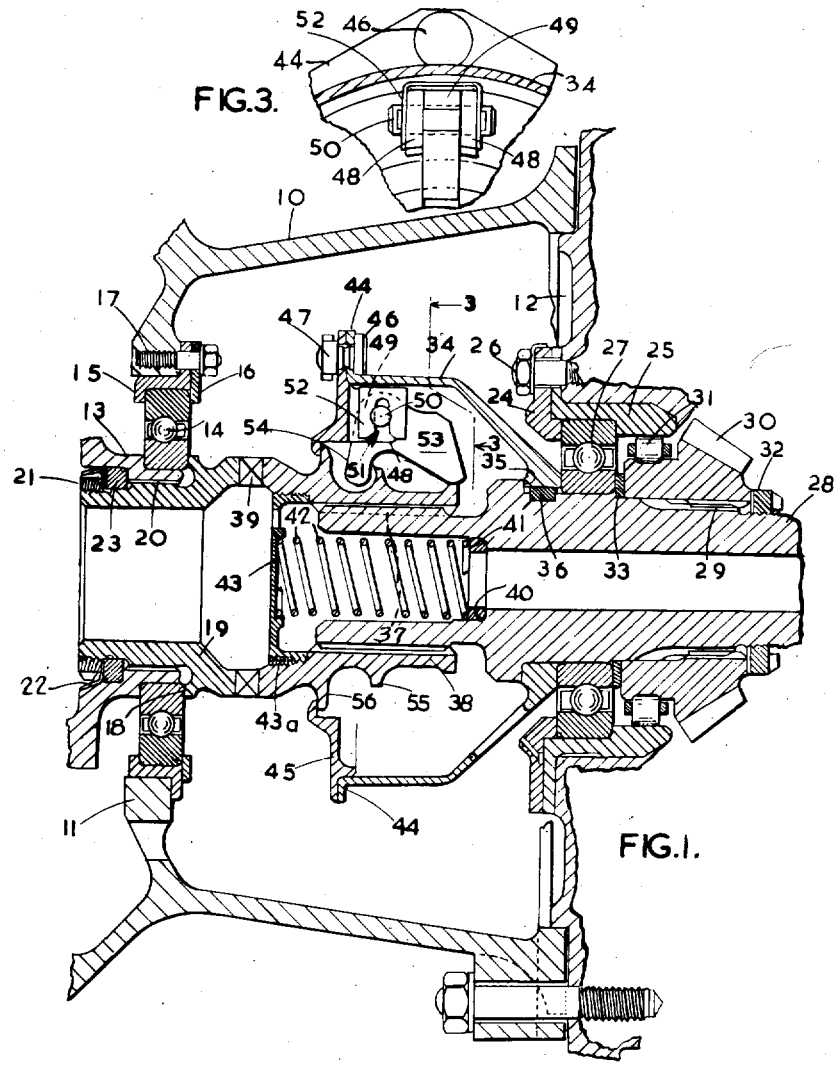
FIG.3.
FIG.1.
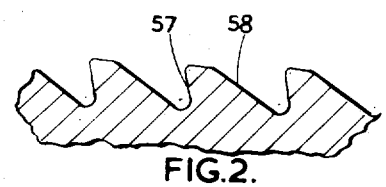
FIG.2.

United States Patent Office 2,921,473
Patented Jan. 19, 1960

2,921,473

DRIVE CONNECTION BETWEEN A STARTER MOTOR AND AN ENGINE

Leslie Richard Fellows, Coventry, England, assignor to Armstrong Siddeley Motors Limited, Coventry, England Application June 10, 1958, Serial No. 741,188

Claims priority, application Great Britain June 21, 1957

8 Claims. (Cl. 74—7)

The invention relates to a normally-engaged drive connection between a starter motor and an engine to be started thereby, and the object of the invention is to enable the engine (e.g., an internal combustion turbine engine) automatically to disengage the drive from the starter motor (which can, for example, be an electrical motor or a starter turbine), and maintain it disengaged, when the engine has been started and becomes self-driving.

The drive connection of the invention includes an axially-engageable clutch of which the movable member can slide axially but not rotate relatively to the engine shaft and is adapted to be slid, against a bias, to the disengaged position by a centrifugally-operating means which is sufficiently energised for the purpose by the engine when the latter has achieved a predetermined speed.

The clutch can be of the dog-type and its movable member can be a sleeve which is splined to the engine shaft, the latter having an end recess to house a compression spring which urges the sleeve in the engaging direction, and the sleeve having an external radial flange to be acted upon, in opposition to the spring effort, by centrifugally-operating elements pivotally carried by a part fast with the engine shaft.

In the accompanying drawings:

Figure 1 is a longitudinal section through one form of drive connection according to the invention, Figure 2 is an enlarged detail view of a preferred form of teeth for a dog-type clutch shown in Figure 1, and Figure 3 is a section, on the line 3—3 of Figure 1, of a centrifugally-operating element of Figure 1 drawn to an enlarged scale.

The embodiment shown in the drawings illustrates an application of the invention to the case where an electric starter motor is used for speeding up an internal combustion turbine engine until the latter becomes self-driving.

Referring to Figure 1, part of a housing for the drive connection is shown at 10, this housing part having an integral end-wall 11 at the left-hand side of the figure and being connected to an end-wall 12 of the engine at the right-hand side.

An annular part 13 driven from the starter motor is supported in an opening of the housing wall 11 by a ball-type combined journal and thrust bearing 14 of which the outer race is clamped between retaining rings 15 and 16 by a circular arrangement of screw means 17 engaged in the said wall. The inner race of the bearing is clamped between an external shoulder of the part 13 and a shoulder 18 of a dog-clutch member 19 which is splined at 20 within the part 13, the clamping pressure being applied by a nut 21, provided with a tab washer 22, on the member 19 and a thrust ring 23 acting on an internal shoulder of the part 13. It will be seen that the dog-clutch member is thus made axially, and rotatively fast with the annular part 13.

The end-wall 12 also has an opening in which is supported, by retaining rings 24 and 25 held in position by a ring of screw means 26, the outer race of a ball-type combined journal and thrust bearing 27 for the engine shaft 28. In the construction shown the shaft 28 has splined to it at 29 a bevel gear wheel 30 (which is not involved in the present invention), the hub of the wheel being supported within the retaining ring 25 by a roller-type journal bearing 31. A nut 32 on the shaft 28 is used to urge the bevel wheel, through a washer 33, to clamp the inner race of the bearing 27 up to a carrier 34 (presently to be described) which is thereby held abutted to a shoulder 35 of the shaft 28, to which latter the carrier is keyed at 36.

The inner end of the shaft 28 has splined to it at 37 a slidable dog-clutch sleeve 38, the adjacent ends of this sleeve and the dog-clutch member 19 being provided with co-acting dog teeth which are shown engaged at 39 in the figure.

A shoulder 40 at the junction of two aligned bores in the shaft 28 provides an abutment for a washer 41 against which reacts one end of a compression spring 42 within the shaft, the other end of this spring reacting on a cap-nut 43 engaged and locked by a set-screw 43a within the inner end of the sleeve 38. In this way the spring normally urges the sleeve for its dog teeth to engage those of the member 19.

The carrier 34 is somewhat bell-shaped, having an out-turned radial flange 44 at its mouth into which spigotally fits a carrier ring 45. This ring is held in position by a circle of bolts 46 with nuts 47. In three positions at 120° apart, the carrier ring is provided with pairs of axially-directed cheeks 48 between each of which is pivotally supported a governor element 49 somewhat in the form of a bell-crank lever. Figure 3 shows that each element 49 is supported from a pivot pin 50 of which the ends extend outwardly beyond the cheeks, where the pin is provided with necks engaged by open slots 51 in an inverted U-shaped retaining plate 52 trapped within the carrier 34.

Each governor element 49 has a centrifugally-acting arm 53 and an arm 54 which, when the shaft 28 achieves a predetermined speed during starting by the starter motor, engages an external radial flange 55 on the sleeve 38 to apply to the latter an axial effort in the direction to disengage the dog clutch. It will be observed that until the governor elements disengage the dog clutch, a second radial flange 56 on the exterior of the sleeve engages a coacting portion of the carrier ring 45 to prevent the spring 42 from urging the dog-teeth too closely into engagement.

Referring now to Figure 2 it will be observed that the dog teeth of the member 19 and sleeve 38, both of which sets of teeth are of the form shown, are somewhat undercut on the drive transmitting faces 57 and have their opposite faces 58 at an appropriate angle for facilitating disengagement when the engine shaft 28 overruns the starter motor.

In operation, the starter motor speeds up the engine shaft 28 due to the dog-clutch being normally held engaged by the spring 42, and it is preferably arranged that when the engine shaft reaches a predetermined speed which is somewhat less than the maximum speed of the starter motor dog-clutch member 19, the governor element arms 53 develop a sufficient centrifugal force for overcoming the effort of the spring but are prevented from withdrawing the sleeve owing to the undercutting of the dog teeth. When the engine becomes self driving and its speed increases to be above that of the starter motor dog clutch member the effect of the undercutting becomes nullified and the centrifugal effort is permitted to compress the spring and withdraw the sleeve to disengage the clutch.

What I claim as my invention and desire to secure by Letters Patent of the United States is:

1. An automatically disengagable drive connection between a starter motor and an engine to be started thereby, said starter motor and said engine having respective shafts aligned with each other, comprising one element of an axially-engagable clutch fast with the starter motor shaft, a coacting element of said clutch slidably but relatively non-rotatively mounted on the engine shaft, means biasing said coacting element axially to engage said one element, centrifugally-operating means mounted on said engine shaft for pivotal movement in a substantially radial plane and an axially fixed pivot for said centrifugally-operating means, said centrifugally-operating means being adapted to act on said coacting element whereby to move the latter axially against said biasing means out of engagement with said one element when said engine shaft achieves a predetermined speed.

2. An automatically disengagable drive connection between a starter motor and an engine to be started thereby, said starter motor and said engine having respective shafts aligned with each other, comprising one element of an axially-engagable dog-type clutch fast with the starter motor shaft, a coacting element of said dog-type clutch slidably but relatively non-rotatively mounted on the engine shaft, means biasing said coacting element axially to engage said one element, centrifugally-operating means mounted on said engine shaft for pivotal movement in a substantially radial plane and an axially fixed pivot for said centrifugally-operating means, said centrifugally-operating means being adapted to act on said coacting element whereby to move the latter axially against said biasing means out of engagement with said one element when said engine shaft achieves a predetermined speed.

3. An automatically disengagable drive connection between a starter motor and an engine to be started thereby, said starter motor and said engine having respective shafts aligned with each other, comprising one element of an axially-engagable dog-type clutch fast with the starter motor shaft, a sleeve slidably but relatively non-rotatively mounted on the engine shaft, a coacting element of said dog-type clutch fast with said sleeve, means biasing said sleeve axially for said coacting elements to engage said one element, centrifugally-operating means mounted on said engine shaft for pivotal movement in a substantially radial plane and an axially fixed pivot for said centrifugally-operating means, said centrifugally-operating means being adapted to act on said sleeve to move the latter axially against said biasing means to disengage said coacting element from said one element when said engine shaft achieves a predetermined speed.

4. An automatically disengageable drive connection between a starter motor and an engine to be started thereby, said starter motor and said engine having respective shafts aligned with each other, comprising one element of an axially-engageable dog-type clutch fast with the starter motor shaft, a sleeve slidably but relatively non-rotatively mounted on the engine shaft, a coacting element of said dog-type clutch fast with said sleeve, means biasing said sleeve axially for said coacting element to engage said one element, centrifugally-operating means mounted on said engine shaft for pivotal movement in a substantially radial plane and an axially fixed pivot for said centrifugally-operating means, said sleeve formed with an external peripheral flange, and said centrifugally-operating means being adapted to act on said flange to move said sleeve axially against said biasing means to disengage said coacting element from said one element when said engine shaft achieves a predetermined speed.

5. An automatically disengageable drive connection between a starter motor and an engine to be started thereby, said starter motor and said engine having respective shafts aligned with each other, comprising one element of an axially-engageable dog-type clutch fast with the starter motor shaft, a sleeve slidably but relatively non-rotatively mounted on the engine shaft, a coacting element of said dog-type clutch fast with said sleeve, means biasing said sleeve axially for said coacting element to engage said one element, a bell-shaped member coaxially fast with said engine shaft, centrifugally-operating means pivotally supported from said bell-shaped member at an axially fixed position adjacent the mouth thereof for pivotal movement in a substantially radial plane, and a pivot pin for said centrifugally-operating means, said sleeve formed with an external peripheral flange, and said centrifugally-operating means adapted to act on said flange to move said sleeve axially against said biasing means to disengage said coacting element from said one element when said engine shaft achieves a predetermined speed.

6. An automatically disengageable drive connection, according to claim 5, in which for supporting the centrifugally-operating means, a mounting ring is attached to the mouth of the bell-shaped member, said mounting ring provided with circumferentially-spaced pairs of axially-directed cheeks, and respective pivot pins axially located to extend between the cheeks of each pair and to serve as a support for a respective centrifugally-operating means.

7. An automatically disengageable drive connection between a starter motor and an engine to be started thereby, said starter motor and said engine having respective shafts aligned with each other, comprising one element of an axially-engageable dog-type clutch fast with the starter motor shaft, a sleeve slidably but relatively non-rotatively mounted on the engine shaft, a coacting element of said dog-type clutch fast with said sleeve, means biasing said sleeve axially for said coacting element to engage said one element, a bell-shaped member coaxially fast with said engine shaft, a mounting ring coaxially fast with the mouth of said bell-shaped member, centrifugally-operating means pivotally supported from said mounting ring for pivotal movement in a substantially radial plane, and axially fixed pivot pins for said centrifugally-operating means, said sleeve formed with a first external peripheral flange, said centrifugally-operating means adapted to act on said flange to move said sleeve axially against said biasing means to disengage said coacting element from said one element when said engine shaft achieves a predetermined speed, and said sleeve formed with a second external peripheral flange adapted to abut said ring to prevent too close an inter-engagement of said dog-type clutch elements under the action of said biasing means.

8. An automatically disengageable drive connection between a starter motor and an engine to be started thereby, said starter motor and said engine having respective shafts aligned with each other, comprising one element of an axially-engageable dog-type clutch fast with the starter motor shaft, a coacting element of said dog-type clutch slidably but relatively non-rotatively mounted on the engine shaft, means biasing said coacting element axially to engage said one element, centrifugally-operating means mounted on said engine shaft for pivotal movement in a substantially radial plane and an axially fixed pivot for said centrifugally-operating means, said centrifugally-operating means being adapted to act on said coacting element whereby to move the latter axially against said biasing means out of engagement with said one element when said engine shaft achieves a predetermined speed, said dog-type clutch elements having dog teeth which are undercut on their driving faces and have their opposite faces at an appropriate angle to facilitate disengagement.

References Cited in the file of this patent

UNITED STATES PATENTS

| | | |
|---|---|---|
| 2,205,622 | Fossa | June 25, 1940 |
| 2,640,359 | Gilbert et al. | June 2, 1953 |
| 2,720,299 | Niemela | Oct. 11, 1955 |
| 2,762,224 | Hoefener et al. | Sept. 11, 1956 |
| 2,776,576 | Simone | Jan. 8, 1957 |
| 2,885,895 | Troeger | May 12, 1959 |